US010225449B2

(12) United States Patent
Zhang

(10) Patent No.: US 10,225,449 B2
(45) Date of Patent: Mar. 5, 2019

(54) OPTICAL SENSOR SYSTEMS AND IMAGE PROCESSING METHODS FOR REMOTE SENSING

(71) Applicant: University of New Brunswick, Fredericton (CA)

(72) Inventor: Yun Zhang, Fredericton (CA)

(73) Assignee: University of New Brunswick, Fredericton, NB (CA)

( * ) Notice: Subject to any disclaimer, the term of this patent is extended or adjusted under 35 U.S.C. 154(b) by 0 days.

(21) Appl. No.: 15/511,772

(22) PCT Filed: Sep. 16, 2015

(86) PCT No.: PCT/CA2015/050905
§ 371 (c)(1),
(2) Date: Mar. 16, 2017

(87) PCT Pub. No.: WO2016/041079
PCT Pub. Date: Mar. 24, 2016

(65) Prior Publication Data
US 2017/0251134 A1    Aug. 31, 2017

Related U.S. Application Data

(60) Provisional application No. 62/051,105, filed on Sep. 16, 2014.

(51) Int. Cl.
*H04N 5/225*    (2006.01)
*G01J 3/28*    (2006.01)
*G06T 5/50*    (2006.01)
*H04N 5/232*    (2006.01)
*G01J 3/36*    (2006.01)

(52) U.S. Cl.
CPC .......... *H04N 5/2258* (2013.01); *G01J 3/28* (2013.01); *G01J 3/2823* (2013.01); *G01J 3/36* (2013.01); *G06T 5/50* (2013.01); *H04N 5/23232* (2013.01); *G01J 2003/2826* (2013.01); *G06T 2207/10036* (2013.01); *G06T 2207/20221* (2013.01)

(58) Field of Classification Search
CPC ..... H04N 5/2258; H04N 5/23232; G01J 3/36; G01J 3/2823; G01J 3/28; G01J 2003/2826; G06T 5/50; G06T 2207/10036; G06T 2207/20221
USPC ...................................... 348/222.1, 270–274
See application file for complete search history.

(56) References Cited

U.S. PATENT DOCUMENTS 7,340,099 B2    3/2008  Zhang
7,835,594 B2    11/2010  Riley et al.
(Continued)

OTHER PUBLICATIONS

N, Keshava and J.F. Mustard, Spectral Unmixing, IEEE Signal Processing Magazine, 2002, 44-57, (19)1.
(Continued)

*Primary Examiner* — Yogesh K Aggarwal
(74) *Attorney, Agent, or Firm* — Eugene F. Derényi; Fogler, Rubinoff LLP

(57) ABSTRACT

According to one embodiment, the present invention relates to (1) a sensor system configuration to record multi-level spatial and spectral information for creating high spatial resolution, large coverage, and high spectral resolution (hyperspectral) images, and (2) a multi-level spatial and spectral resolution sharpening method to create high spatial resolution, large coverage hyperspectral images.

25 Claims, 2 Drawing Sheets

(56) References Cited

U.S. PATENT DOCUMENTS

| | | | |
|---|---|---|---|
| 7,936,949 B2 | 5/2011 | Riley et al. | |
| 8,094,960 B2 | 1/2012 | Riley et al. | |
| 8,478,067 B2 | 7/2013 | Riley et al. | |
| 8,487,996 B2 | 7/2013 | Mann et al. | |
| 8,542,947 B2 | 9/2013 | Xiong et al. | |
| 9,020,274 B2 | 4/2015 | Xiong et al. | |
| 2009/0318815 A1* | 12/2009 | Barnes | A61B 5/0062 600/473 |
| 2010/0226570 A1* | 9/2010 | Riley | G06T 3/4061 382/167 |
| 2014/0043505 A1 | 2/2014 | Qian | |

OTHER PUBLICATIONS

J.M. Bioucas-Dias, A. Plaza, N. Dobiegon, M. Parente, Q. Du, P. Gader, and J. Chanussot, Hyperspectral Unmixing Overview: Geometrical, Statistical, and Sparse Regression-Based Approaches, IEEE Journal of Selected Topics in Applied Earth Observation and Remote Sensing, 2012, 5(2).

K.G. Nikolakopoulos, Spatial resolution enhancement of hyperion hyperspectral data, WHISPERS'09—First Workshop on Hyperspectral Image and Signal Processing, Aug. 26-28, 2009.

G.A. Licciardi, M.M. Khan, J. Chanussot, A. Montanvert, L. Condat, C. Jutten, Fusion of Hyperspectral and panchromatic images using multiresolution analysis and nonlinear PCA band reduction, IEEE IGARRS Jul. 24-29, 2011, Vancouver, Canada.

C. Chisense, J. Engels, M. Hahn and E. Gulch, Pansharpening of Hyperspectral Images in Urban Areas, XXII ISPRS Congress, Aug. 25-Sep. 1, 2012, Melbourne, Australia.

N. Yokoya, N., Mayumi, and A. Iwasaki, Cross-Calibrations for Data Fusion of EO-1/Hyperions and Terra/ASTER, IEEE Journal of Selected Topics in Applied Earth Observations and Remote Sensing, 2012.

A.M. Manferdini, F. Remondino, A Review of Reality-Based 3D Model Generation, Segmentation and Web-Based Visualization Methods, International Journal of Heritage in the Digital Era, 2012, 103-123, 1(1).

B. De Vries, J. Van Den Tillaart, K. Slager, R. Vreenegoor, J. Jessurun, Creating 3d Models from Sketch Plans for Spatial Landscape Evaluation, International Journal of E-Planning Research, 2012, 42-55, 1(1).

Y. Furukawa and J. Ponce, Accurate, dense and robust multiview stereopsis, IEEE Trans. PAMI, 2010, 1362-1376, 32.

A. Gruen, Reality-based generation of virtual environments for digital earth. International Journal of Digital Earth, 2008, 88-106, 1(1).

F. Remondino, Heritage recording and 3D modeling with photogrammetry and 3D scanning, Remote Sensing, 2011, 1104-1138, 3.

T. Toutin: Comparison of stereo-extracted DTM from different high-resolution sensors: SPOT-5, EROS-a, IKONOS-II, and QuickBird. IEEE Trans. on Geoscience and Remote Sensing, 2004, 2121-2129, 42.

A. Alobeid, K. Jacobsen, and C. Heipke, Comparison of Matching Algorithms for DSM Generation in Urban Areas from Ikonos Imagery. Photogrammetric Engineering & Remote Sensing, 2010, 1041-1050, 76(9).

S. Mukherjee, A. Mukhopadhyay, A. Brardwaj, A. Mondal, S. Kundu, and S. Hazra, Digital Elevation Model Generation and Retrieval of Terrain Attributes using CARTOSAT-1 Stereo Data, Int. Journal of Science and Technology, 2012, (2)5.

Z. Xiong and Y. Zhang, A Generic Method for RPC Refinement using Ground Control Information, Photogrammetric Engineering & Remote Sensing, 2009, 1083-1092, 75.

Z. Xiong and Y. Zhang, A Novel Interest Point Matching Algorithm for High Resolution Satellite Images, IEEE Trans. on Geoscience and Remote Sensing, 2009, 4189-4200, (47)12.

Z. Xiong and Y. Zhang, 2011: Bundle Adjustment with Rational Polynomial Camera Models Based on Generic Method, IEEE Trans. on Geoscience and Remote Sensing, 2011, 190-202 (49)1.

Y. Zhang and R.K. Mishra, A review and comparison of commercially available pan-sharpening techniques for high resolution satellite image fusion, IEEE IGARRS, Jul. 22-27, 2012.

Y. Zhang, Highlight Article: Understanding Image Fusion. Photogrammetric Engineering & Remote Sensing, 2004, 657-661, (70)6.

Y. Zhang, Ten Years of Technology Advancement in Remote Sensing and the Research in the CRC-AGIP Lab in GGE, Geomatica, 2010, 173-189, (64)2.

G. Palubinskas et al, Multi-resolution, multi-sensor image fusion: general fusion framework, Proc of Joint Urban Remote Sensing Event JURSE, 2011, 313-316, Apr. 11-13.

S. De Bethune et al, Fusion of multispectral and panchromatic images by local mean and variance matching filtering techniques, Fusion of Earth Data, Jan. 28-30, 1998, Sophia Antipolis, France.

N. Mayumi, and A. Iwasaki, Image sharpening using hyperspectral and multispectral data, IEEE International Geoscience and Remote Sensing Symposium, 2011, 519-522, Jul. 24-29, Vancouver, Canada.

G.A. Licciardi, M.M. Khan, and J., Chanussot, Fusion of hyperspectral and panchromatic images: a hybrid use of indusion and nonlinear PCA, IEEE ICIP 2012, 2133-2136.

S. Qian, M. Bergeron, R. Girard, and G. Kroupnik, Concept study of Canadian hyperspectral mission, IGARSS, 2014, 2578-2581.

N.Yokoya, T. Yairi, and A. Iwasaki, Coupled nonnegative matrix factorization unmixing for hyperspectral and multispectral data fusion, IEEE Transactions on Geoscience and Remote Sensing, 2012, 528-537 (50)2.

T. Matsunaga, A. Iwasaki, S. Tsuchida, J. Tanii, O., Kashimura, R. Nakamura, H. Yamamoto, T. Tachikawa, S. Rokugawa, Current status of hyperspectral imager suite (HISUI), IGARSS, 2013, 3510-3513.

S. Qian, R. Girard, G. Kroupnik, Development of a Canadian hyperspectral imager onboard micro-satellites, IGARSS, 2013, 3506-3509.

ISA/CA 2015/050905—Written Opinion and Search Report of the International Searching Authority dated Nov. 20, 2015.

\* cited by examiner

OPTICAL SENSOR SYSTEMS AND IMAGE PROCESSING METHODS FOR REMOTE SENSING

The present invention relates to remote sensing in general and optical sensor systems and image processing methods for remote sensing in particular.

BACKGROUND

Hyperspectral remote sensing (with more than a dozen and up to hundreds of spectral bands) is important for land cover classification, target detection, and applications in natural resources, forestry, agriculture, geology, and military. However, (1) limited spatial resolution, and (2) enormous data volume are two of the major limitations of hyperspectral remote sensing, which significantly hinder the collection and application of hyperspectral images in a broad range of areas. For large ground coverage, the data volume will be even greater.

To increase the spatial resolution, a prior art solution for airborne hyperspectral sensors is to fly at a lower altitude but at the cost of reducing the ground coverage (i.e. the ground coverage is narrower for each flight as compared to images taken at a higher attitude). For satellite sensors, the solution is to increase the focal length of the lens, which also significantly reduces the ground coverage per orbit circle. The reduction of ground coverage means a reduction in the efficiency of remote sensing data collection. More flight time is needed to cover the same area.

Therefore, to overcome the limitation of spatial resolution without narrowing the ground coverage, research on pixel unmixing of hyperspectral images has been an active topic for decades, in order to interpret spectral information that is smaller than one ground pixel. To date, prior art pixel unmixing techniques still need to be supported by some known information from other sources. Nonetheless, only very limited success has been achieved [01] [02].

On the other hand, to increase the spatial resolution of hyperspectral ("HS") images, some researchers have recently begun to explore the potential of using pan-sharpening techniques to fuse panchromatic ("Pan") images with a few selected hyperspectral bands [03] [04] [05]. A few others have used selected multispectral ("MS") bands to fuse with selected HS bands [06]. Some existing pan-sharpening techniques were used in the fusions. Although more detail can be seen in the fusion results, their quality is still poor with obvious noise, colour distortion, and/or unnatural integration between spectral and spatial information.

Hyperspectral imaging typically involves relatively large volumes of data. To reduce the data volume, a common solution is the use of data compression (such as JPEG format). But, if lossless compression is used, the compression rate will not be high. Not much data volume can be reduced. If lossy compression is used, some image information will be lost, which is not acceptable for most remote sensing applications.

In view of the foregoing, there is a need for an improved sensor system and method to enlarge ground coverage, but still keep the spatial resolution and maintain manageable data volume for hyperspectral images.

BRIEF DESCRIPTION OF THE DRAWINGS

Various embodiments of the present invention will now be described with reference to the drawings, in which.

DESCRIPTION

Figure 1:
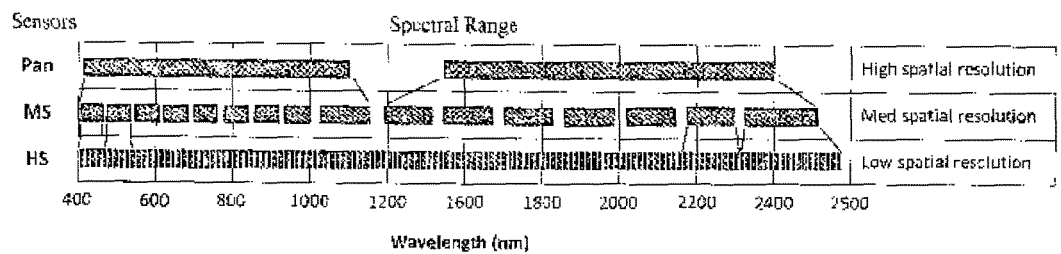
FIG. 1 is a graph of the spectral ranges of a multi-sensor assembly according to an embodiment of the present invention.

Remote sensing images with more than a dozen and up to hundreds of spectral bands are broadly defined as hyperspectral ("HS") images. However, more narrowly, hyperspectral images can also be further divided into superspectral ("SS") images and HS images, where the former contain more than a dozen but less than 100 spectral bands and the latter contain more than 100 spectral bands. In the present invention, if not specifically defined, the broad HS definition is used. If SS is used, the narrow HS definition is used.

According to one embodiment, the present invention relates to (1) a sensor system configuration to record multi-level spatial and spectral information for creating high spatial resolution, large coverage, and high spectral resolution (hyperspectral) images, and (2) a multi-level spatial and spectral resolution sharpening method to create high spatial resolution, large coverage hyperspectral images.

According to another embodiment, the present invention relates to a multi-sensor system for recording necessary information of high spatial resolution, large coverage, and high spectral resolution for creating high spatial resolution and large coverage hyperspectral images.

According to a further embodiment, the present invention relates to a multi-level spatial and spectral resolution sharpening method for creating high spatial resolution and large coverage hyperspectral images from the images collected by the multi-sensor system.

According to a still further embodiment, a multi-sensor system according to the present invention optimally utilizes the complementary relationship between spatial resolution (pixel size) and spectral resolution (bandwidth) of optical sensors to collect desired high spatial resolution, high spectral resolution and large ground coverage information using a set of different sensors respectively.

According to another embodiment, the present invention relates to a multi-level spatial and spectral resolution sharpening method for fusing high spatial resolution and high spectral resolution information from different images into one image to create a high spatial resolution and large coverage hyperspectral image.

According to another embodiment, the present invention relates to a method for producing a sharpened image comprising the steps of obtaining image data defining a first image, the first image having a first spatial resolution and a first spectral resolution, obtaining image data defining a second image, the second image having a second spatial resolution and a second spectral resolution, the second spatial resolution being lower than the first spatial resolution and the second spectral resolution being higher than the first spectral resolution, obtaining image data defining a third image, the third image having a third spatial resolution and a third spectral resolution, the third spatial resolution being lower than the second spatial resolution and the third spectral resolution being higher than the second spectral resolution, fusing the image data of the second image and the third image to produce a fourth image, and fusing the image data of the first image and the fourth image to produce a fifth image, wherein the fifth image is a final sharpened image. The image data for the first image may have been collected by one or more panchromatic sensors, the image data for the second image may have been collected by one or more multi-spectral sensors, and the image data for the third image may have been collected by one or more sensors selected from the group consisting of superspectral and hyperspectral sensors. All the sensors may be either airborne based sensors or satellite-based sensors or terrestrial sensors. All of the sensors may have the same FOV and the same ground swath. The first, second, and third images may have a common overlapping area. The image data fused may comprise image data defining all or a part of a common overlapping area. The first image may be a panchromatic image type, the second image may be a multi-spectral image type, and the third image may be a hyperspectral or a superspectral image type. The image data fused may further comprise all of the spectral bands of the second and third images defining the spectral resolution of the common overlapping area.

According to another embodiment, the present invention relates to a method for producing a sharpened image comprising the steps of obtaining image data defining a first image, the first image having a first spatial resolution and a first spectral resolution, obtaining image data defining a second image, the second image having a second spatial resolution and a second spectral resolution, the second spatial resolution being lower than the first spatial resolution and the second spectral resolution being higher than the first spectral resolution, obtaining image data defining a third image, the third image having a third spatial resolution and a third spectral resolution, the third spatial resolution being lower than the second spatial resolution and the third spectral resolution being higher than the second spectral resolution, obtaining image data defining a fourth image, the fourth image having a fourth spatial resolution and a fourth spectral resolution, the fourth spatial resolution being lower than the third spatial resolution and the fourth spectral resolution being higher than the third spectral resolution, fusing the image data of the third image and the fourth image to produce a fifth image, fusing the image data of the second image and the fifth image to produce a sixth image, and fusing the image data of the first image and the sixth image to produce a seventh image, wherein the seventh image is a final sharpened image. The image data for the first image may have been collected by one or more panchromatic sensors, the image data for the second image may have been collected by one or more multi-spectral sensors, the image data for the third image may have been collected by one or more superspectral sensors, and the image data for the fourth image may have been collected by one or more hyperspectral sensors. All the sensors may be either airborne based sensors or satellite-based sensors or terrestrial sensors. All the sensors have the same FOV and the same ground swath. The first, second, third, and fourth images may have a common overlapping area. The image data fused may comprise image data defining all or a part of the common overlapping area. The first image may be a panchromatic image type, the second image may be a multi-spectral image type, the third image may be a superspectral image type, and the fourth image may be a hyperspectral image type, the image data fused may further comprise all of the spectral bands of the second, third, and fourth images defining the spectral resolution of the common overlapping area.

According to another embodiment, the present invention relates to a method for producing a sharpened image comprising obtaining image data defining a high spatial resolution, low spectral resolution image, such image being called a HR-Pan image; obtaining a medium spatial resolution, medium spectral resolution, such image being called a MR-MS image; obtaining image data defining a low spatial resolution, high spectral resolution image, such image being called a LR-HS image; fusing the LR-HS image and the MR-MS image to produce a sharpened MR-HS image; and fusing the sharpened MR-HS image and the HR-Pan image to produce a sharpened HR-HS image, the HR-Pan image may have a spatial resolution of 1 m and 1 spectral band; the MR-MS image may have a spatial resolution of 3 m and 10 spectral bands; and the LR-MS image may have a spatial resolution of 9 m and 200 spectral bands. In the step of fusing bands of the MR-MS image and bands of the LR-HS image to produce MR-HS bands, the LR-HS bands being fused may be located in the same or similar spectral range as the bands of the MR-MS image being fused, to produce fused MR-HS bands, and in the step of fusing the band of the HR-Pan image and the fused MR-HS bands, the fused MR-HS bands may be located in the same or similar spectral range as the band of the HR-Pan image. In the step of fusing bands of the MR-MS image and bands of the LR-HS image to produce MR-HS bands, the LR-HS bands being fused may not be in the same or similar spectral range as the bands of the MR-MS image being fused, to produce fused MR-HS bands, and in the step of fusing the band of the HR-Pan image and the fused MR-HS bands, the fused MR-HS bands may not be located in the same or similar spectral range as the band of the HR-Pan image.

According to another embodiment, the present invention relates to a method for producing a sharpened image comprising obtaining image data defining a high spatial resolution, low spectral resolution image, such image being called a MR-Pan (VNIR) image; obtaining image data defining a medium spatial resolution, medium spectral resolution, such image being called a MR-MS (VNIR) image; obtaining image data defining a low spatial resolution, medium spectral resolution image in another spectral range, such image being called a LR-MS (SWIR) image; obtaining medium spatial resolution Pan (VINR) image [MR-Pan (VNIR)] from the HR-Pan (VNIR) image; obtaining low spatial resolution MS (VNIR) image [LR-MS (VNIR)] from the MR-MS (VNIR) image; fusing the LR-MS (SWIR) image and the MR-Pan (VNIR) image to produce a sharpened MR-MS (SWIR) image; and fusing the MR-MS (VNIR) image and the sharpened MR-MS (SWIR) image with the HR-Pan (VNIR) image to produce a sharpened HR-MS (VNIR) image and a HR-MS (SWIR) image. In the previous step, fusing the MR-MS (VNIR) image with the HR-Pan (VNIR) image to produce a sharpened HR-MS (VNIR) image or fusing the MR-MS (SWIR) image with the HR-Pan (VNIR) image to produce a sharpened HR-MS (SWIR) image. At least one spectral band of the LR-MS (VNIR) image may be used as a reference to fuse the LR-MS (SWIR) image and the MR-Pan (VNIR) image, to produce a sharpened MR-MS (SWIR) image. At least one spectral band of the MR-MS (VNIR) image may be used as a reference to fuse the MR-MS (VNIR) image and the MR-MS (SWIR) image with the HR-Pan (VNIR) image, to produce a sharpened HR-MS (VNIR) image and HR-MS (SWIR) image.

According to another embodiment, the present invention relates to a method for producing a sharpened image comprising the steps of obtaining image data defining a first image, the first image having a first spatial resolution and a first spectral resolution, obtaining image data defining a second image, the second image having a second spatial resolution and a second spectral resolution, obtaining image data defining a third image, the third image having a spatial resolution and a third spectral resolution, fusing the image data of two of the first, second and third images to produce a fourth image, and fusing the image data of the fourth image with the image data of the image not fused to product the fourth image, to produce a fifth image, wherein the fifth image is a sharpened image. The first, second and third images may have substantially the same ground coverage. Prior to production of the fourth image, at least one of the first, second and third spatial resolutions may be reduced whereby the first, second and third spatial resolutions are not equal. According to another embodiment, the present invention relates to an image sensor configuration for airborne or satellite-based or terrestrial imagery, the sensor configuration comprising a Pan sensor; a MS sensor; and a HS sensor, wherein the Pan sensor is configured to obtain image data defining a high spatial resolution and low spectral resolution image; the MS sensor is configured to obtain image data defining a medium spatial resolution and medium spectral resolution image; and the HS sensor is configured to obtain image data defining a low spatial resolution and high spectral resolution image. The image sensor configuration may further comprise a SS sensor configured to obtain image data defining a spatial resolution between those of the MS sensor and the HS sensor, and a spectral resolution between those of the MS sensor and the HS sensor.

According to another embodiment, the present invention relates to an image sensor configuration for airborne or satellite-based or terrestrial imagery, the sensor configuration comprising first, second and third image sensors, wherein the first image sensor having a first spatial resolution and a first spectral resolution, the second image sensor having a second spatial resolution and a second spectral resolution, the second spatial resolution being lower than the first spatial resolution and the second spectral resolution being higher than the first spectral resolution, and the third image sensor having a third spatial resolution and a third spectral resolution, the third spatial resolution being lower than the second spatial resolution and the third spectral resolution being higher than the second spectral resolution.

According to certain embodiments, the present invention relates to a combination of a multi-sensor system and a multi-level sharpening method for collecting and creating a high spatial resolution and large coverage hyperspectral image, which has up to or more than 27 times higher spatial resolution and more than 10 times larger ground coverage, compared to prior art single sensor hyperspectral technology. The combination of the multi-sensor system and the multi-level sharpening method can reduce the data volume by up to or more than 83 times, compared to prior art single sensor hyperspectral technology.

According to another embodiment, the present invention relates to a sensor system which can collect multi-level spatial and spectral information for high spatial resolution, high spectral resolution (hyperspectral), and large ground coverage images by effectively utilizing the complementary relationship between spectral bandwidth and spatial resolution of optical sensors. A set of specifically configured sensors is needed for the data collection. A high spatial resolution, large coverage hyperspectral image can then be created by effectively combining the multi-level spatial and spectral information from the set of sensors through an automated multi-level spatial and spectral resolution sharpening process.

Fused/sharpened images generally contain more data volume than the original images before the fusion/sharpening, because the spatial resolution of the fused/sharpened images is increased. According to certain embodiments of the present invention, the final high spatial resolution and large coverage hyperspectral images are produced "on-the-fly" as they are needed. The original images before the fusion/sharpening are kept for image data transmission purposes (such as from satellite to ground, from data vendor to end user, or others) and for image data storage purposes to keep the data volume small.

Sensor Configuration

For multi-sensor systems according to embodiments of the present invention, different variations of sensor configurations are possible, as long as the sensor system follows the general principle of the complementary relationship between spectral bandwidth and spatial resolution of optical sensors.

The configuration of a sensor system according to an embodiment of the present invention, in terms of spectral bandwidth (spectral resolution) and spatial resolution, is illustrated in FIG. 1. It includes three different types of sensors: Pan (panchromatic), MS (multispectral), and HS (hyperspectral) sensors. The number of each type of sensors may vary. More particularly, in the sensor system of FIG. 1, there are the following sensors:

(1) two Pan sensors, each covers one broad spectral bandwidth (such as Pan 1 and Pan 2), to collect two high spatial resolution panchromatic (HR-Pan) (monochrome) images, at the cost of losing spectral resolution (information);

(2) two MS sensors with medium spectral bandwidths and a total of 16 spectral bands (such as MS1, MS2, . . . , MS16) to collect medium spatial resolution multispectral (MR-MS) images, at the cost of losing some spatial resolution while gaining some spectral resolution; and (3) two HS sensors with narrow spectral bandwidths and a total of 220 spectral bands (such as HS1, HS2, . . . , HS220) to collect low spatial resolution hyperspectral (LR-HS) images, at the cost of significantly losing spatial resolution while significantly gaining spectral resolution.

For each sensor type, the number of sensors may vary depending on the sensor design and the sensor materials used. The spectral range of the sensors can also go beyond 2500 nm as illustrated in FIG. 1.

For each type of sensor, the spatial resolution can also be adjusted to allow each sensor to collect a different spatial resolution. The light energy coming to a sensor is much weaker in short wave infrared (SWIR) range than in visible and near infrared (VNIR) range. Therefore, the spatial resolution of the Pan, MS, or HS sensor in short wave infrared range can be lower than that of the corresponding sensor in visible and near infrared range.

In addition, the sensor configuration illustrated in FIG. 1 can also be split into two or more sets of sensors, such as the Pan, MS, and HS sensors in visible and near infrared (VNIR) spectral range are grouped as one set of multi-level sensors, and the Pan, MS, and HS sensors in short wave infrared (SWIR) are grouped as another set of sensors. The two sets of sensors can be used together and also separately.

Because broader spectral bandwidths allow for more photons coming into the sensor's pixels, the pixels can be smaller but still receive sufficient photons to form an image.

On the other hand, narrower spectral bandwidths allow for less photons coming into the sensor's pixels, so the pixels must be bigger in order to receive sufficient photons. Utilizing this complementary relationship between spatial and spectral resolutions, a set of specifically configured sensors can be designed; each collects a high spatial and low spectral resolution image, a medium spatial and medium spectral resolution image, and a high spectral and low spatial resolution image respectively.

In other embodiments, a sensor system according to the present invention can also be extended to include four different types of sensors, such as Pan (panchromatic), MS (multispectral), SS (superspectral) and HS (hyperspectral) sensors, to make the spatial and spectral resolution changes between different sensors more gradually. For example (example 1), a set of sensors with 2 Pan bands at 1 m, 10 MS bands at 3 m, 50 SS bands at 9 m, and 250 HS bands at 27 m. Other sets of sensor configurations are also possible.

Figure 2:
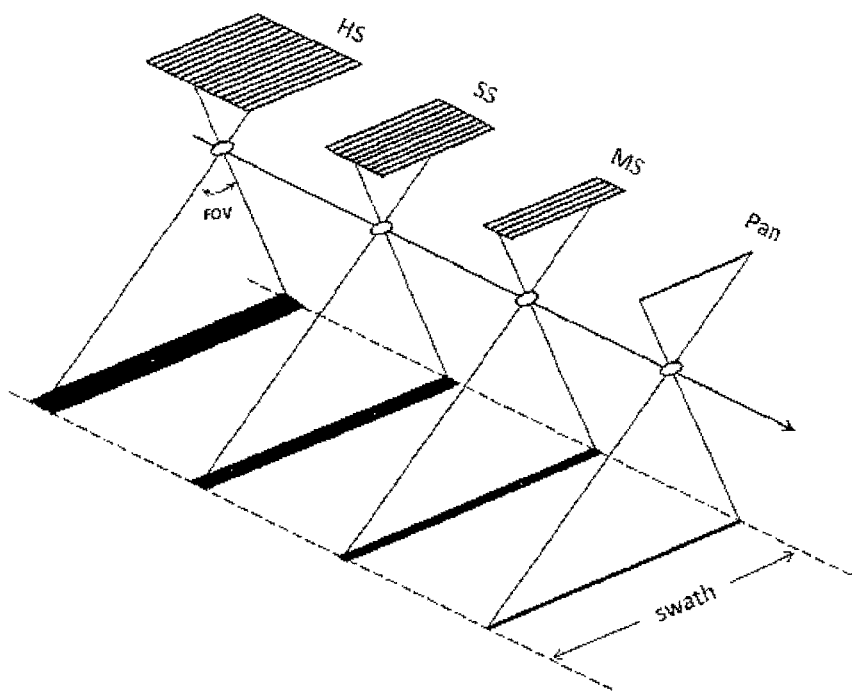
FIG. 2 is a diagram depicting the relative spectral resolutions of Pan, MS, superspectral ("SS"), and HS sensors with the same field of view ("FOV") and the same swath.
Figure 3:
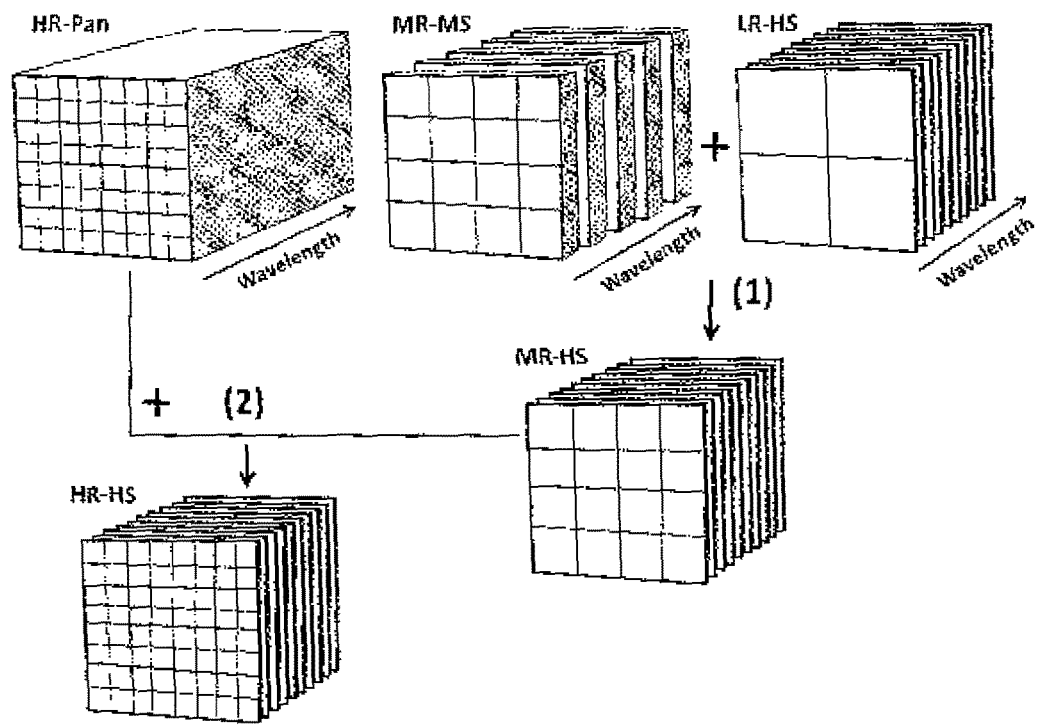
FIG. 3 is a diagram depicting a method of fusion according to an embodiment of the present invention; and, FIG. 4 is a graph depicting the spatial and spectral resolutions of the sensors of the WorldView-3 satellite.

Referring to FIG. 2 and FIG. 3, although the spatial resolutions of the sensors are different, they cover the same ground area. Because the spatial resolution of the HS sensor is lower than that of SS sensors and much lower than MS and Pan sensors, it is feasible for the HS sensor to cover the same area as do the SS, MS, and Pan sensors and still receive sufficient photons to form an image.

Referring to FIG. 2 and FIG. 3, in an assembly of the Pan, MS, SS, and HS sensors according to an embodiment of the present invention, all the sensors have the same sensor FOV and the same ground swath, but different pixel sizes (spatial resolutions) and different spectral bandwidths. This allows for easier and better co-registration between all images, ensuring better fusion quality between the images of the sensors. This also maximizes the common overlapping area of all the sensors, minimizing unused image areas. Other sensor assemblies with varying FOV or varying swaths may be useable in sensor systems according to the present invention, but the image processing efficiency or image use efficiency may be reduced.

Methods to Create High Spatial Revolution Hyperspectral Images

A multi-level spatial and spectral resolution sharpening method, according to another embodiment of the present invention, can be used to create high spatial resolution and large coverage hyperspectral images. The general principle of the method is illustrated in FIG. 3, which includes the following steps:
(1) fusing a low spatial resolution but high spectral resolution (hyperspectral) image ("LR-HS") with a medium spatial resolution and medium spectral resolution (multispectral) image ("MR-MS") to create a medium spatial resolution but high spectral resolution image ("MR-HS"); and then
(2) fusing the medium spatial resolution but high spectral resolution image ("MR-HS") from step (1) above, with a high spatial resolution but low spectral resolution (panchromatic) image ("HR-Pan") to create a high spatial resolution and high spectral resolution image ("HR-HS").

For example (example 2), if a sensor system according to an embodiment of the present invention collects:
a high spatial resolution (1 m) and low spectral resolution (1 band, Pan) image (1 HR-Pan band),
a medium spatial resolution (3 m) and medium spectral resolution (10 bands, MS) image (10 MR-MS bands), and
a low spatial resolution (9 m) and high spectral resolution (200 bands, HS) image (200 LR-HS bands), the multi-level spatial and spectral resolution sharpening is conducted as follows:
(1) The 9 m LR-HS image (200 bands) will be fused with the 3 m MR-MS image (10 bands) to produce a sharpened am MR-HS image (200 bands).
(2) The sharpened 3 m MR-HS image (200 bands) will then be fused with the 1 m HR-Pan image (1 band) to create a sharpened 1 m HR-HS image (200 bands).

For better results, each of the MR-MS bands is fused with those LR-HS bands that locate in the same or similar spectral range of the MR-MS band, respectively (as partially shown in FIG. 1), to produce MR-HS bands. The HR-Pan is then fused with those MR-HS bands located in the same or similar spectral range of the Pan, to produce HR-HS bands.

A MR-MS band can also be fused with those LR-HS bands that do not locate in the same or similar spectral range. The same can be applied to the fusion between HR-Pan and MR-HS image bands as well. However, certain colour distortion may occur.

If a sensor system according to an embodiment of the present invention has four different sensors, such as Pan, MS, SS and HS sensors, as described above in example 1, the multi-level spatial and spectral resolution sharpening method according to an embodiment of the present invention will include three steps:
(1) fusing 27 m HS image (250 bands) with 9 m SS image (50 bands), respectively, to create 9 m HS image (250 bands);
(2) fusing 9 m HS image (250 bands) with 3 m MS image (10 bands), respectively, to create 3 m HS image (250 bands); and
(3) fusing 3 m HS image (250 bands) with 1 m Pan (2 bands), respectively, to create 1 m HS image (250 bands).

Spatial Resolution Increase and Data Volume Reduction

If a sensor system according to an embodiment of the present invention collects 2 Pan bands at 1 m, 10 MS bands at 3 m, 50 SS bands at 9 m, and 250 HS bands at 27 m, as described in example 1, the spatial resolution of the HS bands will be increased from 27 m to 1 m; an increase of 27 times. The data volume will be reduced from 1,822.5 MB to 29.68 MB; a data volume reduction of 61.4 times. The 1,822.5 MB is the data volume of the final high spatial resolution HS image which has 2700×2700 pixels per band, and 250 bands (2700×2700×250=1,822.5 MB). The 29.66 MB is the sum of the data volumes of the original HS (100×100 pixels per band, 250 bands), SS (300×300 pixels per band, 50 bands), MS (900×900 pixels per band, 10 bands), and Pan (2700×2700 pixels per band, 2 bands.

If a sensor system according to an embodiment of the present invention collects HR-Pan, MR-MS and LR-HS images like those described above in example 2, the spatial resolution of the final HR-HS image will be 9 times higher than that of the original LR-HS image, and the data volume will be reduced by 44 times compared to that of a 1 m, 200 bands HR-HS image directly collected by a HR-HS sensor.

If the spatial resolution ratio between HR-Pan and MR-MS is 1/4 and between MR-MS and LR-HS is also 1/4, the spatial resolution of HR-HS image will be increased by 16 times. The data volume will be reduced by 83 times (assuming HR-Pan has 1 band, MR-MS 10 bands, LR-HS 200 bands; and the resolution ratio between HR-Pan, MR-MS and LR-HS is 1/4).

A spatial resolution increase of 9 to 27 times and a data volume reduction of 44 to 83 times are revolutionary improvements, compared to conventional hyperspectral data collection technologies.

Besides the substantial increase of spatial resolution and massive reduction of data volume, the new sensor system disclosed in this invention can also enlarge the ground coverage (swath) by up to 27 times for the same spatial resolution, compared to the current technology.

Variation of Multi-level Spatial and Spectral Resolution Sharpening

The concept of the aforementioned multi-level spatial and spectral resolution sharpening method can also be adjusted to fuse multi-level spatial resolution images collected by sensor systems with varying configurations.

Figure 4:
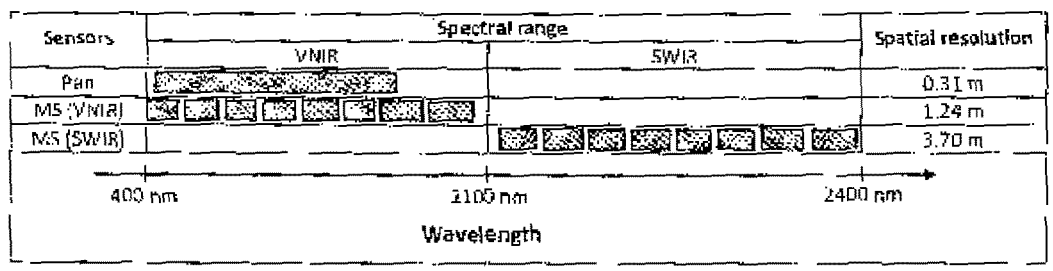

For example, as illustrated in FIG. 4 the WorldView-3 satellite (to be launched in 2014) carries one high resolution Pan sensor to capture 1 band of high spatial resolution (0.31 m) Pan image (HR-Pan) in visible and near infrared (VNIR) spectral range, and multiple MS sensors to capture 8 bands of medium spatial resolution (1.24 m) MS image (MR-MS) in VNIR range and 8 bands of low spatial resolution (3.7 m) MS image (LR-MS) in short wave infrared (SWIR) range. Even though WorldView-3 carries multiple sensors and has 3 different spatial resolutions, its sensor configuration is still a traditional configuration, because it has only one or at most two spatial resolution levels in each spectral range (i.e. VNIR or MWIR). And, it has only one or at most two different types of sensors in each of the spectral ranges.

According to certain embodiments of the present invention, the WorldView-3 images in the VNIR range can be resampled to create multi-level spatial resolutions (i.e. 3 spatial resolution levels, more than the traditional 2 levels). The multi-level spatial and spectral resolution sharpening can then be conducted to increase not only the spatial resolution of the MS image (1.24 m) in VNIR range, but also that of the MS image (3.7 m) in MWIR range. The resampling and the multi-level sharpening can be conducted in the following steps:

(1) reducing the spatial resolution of MS (VNIR) image (1.24 m) to that of MS (SWIR) image (3.7 m), to create a simulated low resolution MS (VNIR) image (3.7 m); i.e. creating a row spatial resolution MS (VNIR) image [LR-MS (VNIR)] from the medium spatial resolution MS (VNIR) image [MR-MS (VNIR)], (2) reducing the spatial resolution of the Pan image (0.31 m) to that of MS (VNIR) image (1.24 m), to create a simulated medium resolution Pan image (1.24 m); i.e. creating a medium spatial resolution Pan (VNIR) image [MR-Pan (VNIR)] from the high spatial resolution Pan (VNIR) image [HR-Pan (VNIR)], (3) Fusing the medium resolution (1.24 m) Pan image [MR-Pan (VNIR)] with the low resolution (3.7 m) MS (SWIR) image [LR-MS (SWIR)], using at least one spectral band of the simulated low resolution (3.7 m) MS (VNIR) image [LR-MS (VNIR)] as reference, to create a medium resolution (1.24 m) MS (SWIR) image [MR-MS (SWIR)], and (4) Fusing the high resolution (0.31 m) Pan image [HR-Pan (VNIR)] with the original medium resolution (1.24 m) MS (VNIR) image [MR-MS (VNIR)] and the created medium resolution (1.24 m) MS (SWIR) image [MR-MS (SWIR)], to create a high resolution (0.31 m) MS (VNIR) image [HR-MS (VNIR)] and high resolution (0.31 m) MS (SWIR) image [HR-MS (SWIR)].

Referring to FIGS. 1, 2 and 3, and the variation described with respect to FIG. 4, and according to the principles of utilizing the complimentary information in a narrow bandwidth image and a broad bandwidth image (such as MS (narrow) versus Pan (broad) or HS (narrow) versus MS (broad) images) to create a high spatial resolution and high spectral resolution image described above, the present invention can in accordance with embodiments of the present invention, be further extended to fuse two or more MS images with different spatial resolutions that cover the same or different spectral ranges. The following steps may be applied to fuse the MS images:

(1) If the spectral ranges of the high spatial resolution MS image is the same as or similar to that of the low resolution MS image:
  a. simulating a high resolution Pan image from the high resolution MS image by combining all the MS bands into one band, and
  b. fusing the simulated high resolution Pan image with the original low resolution MS to create a high resolution MS image that has the same bandwidth as the original low resolution MS image.

(2) If the spectral ranges of the high spatial resolution MS image is not the same as or similar to that of the row resolution MS image (such as the MS (VNIR) image and MS (SWIR) image as shown in FIG. 4 but the original Pan (VNIR) is not available):
  a. simulating a high resolution Pan (VNIR) image from the high resolution MS (VNIR) image by combining all the MS bands into one band,
  b. reducing the spatial resolution of the high resolution MS (VNIR) image to that of the low resolution MS (SWIR) image through pixel binning to simulate a low resolution MS (VNIR) image, and
  c. fusing the simulated high resolution Pan (VNIR) image with the low resolution MS (SWIR) image, using at least one spectral band of the simulated low resolution MS (VNIR) image as reference, to create a high resolution MS (STIR) image.

According to certain embodiments of the present invention, methods of the present invention can be used to fuse/sharpen images from the Pan, MS and HS sensors on board NASA's EO-1 satellite. The spatial resolution of MS and HS sensors on board EO-1 are the same (30 m); whereas ground coverage of the EO-1 HS sensor with a 7.5 km width is much narrower than that of the EO-1 MS sensor with a 30 km width. Even with narrower ground coverage, the HS sensor cannot collect good quality HS images.

In applying the method according to one embodiment of the present invention to fuse/sharpen EO-1 images, the spatial resolution of an EO-1 HS image is reduced from 30 m to 90 m to improve the signal to noise ratio (SNR) (i.e., improve the quality of the HS image at the cost of losing spatial resolution). The 30 m MS image is fused with the 90 m HS image to create a 30 m HS image (this image has much better quality than the original 30 m HS image). Then, the 10 m Pan image is fused with the fused 30 m HS to create a 10 m HS image.

Methods according to embodiments of the present invention can be used to fuse/sharpen images from 3 or more sensors where the spatial resolutions of the 3 or more sensors are different. The spatial resolution can be adjusted by adjusting the pixel size or the focal length. The ground coverage of the images used in the methods of the present invention are preferably the same but may be different. If the ground coverage is different, overlap areas of the images may be used.

It is understood that the methods according to embodiments of the present invention can be carried out using programed general purpose computers. Conventional fusion methods, such as the UNB PanSharp fusion method, can be employed to carry out the image fusion steps.

It is understood that the method of reducing the spatial resolutions of the Pan and MS (VNIR) images to create 3-lever spatial resolution images which have certain spectral overlap between each level is just one example. The multi-level fusion of the Pan with MS images is also one example. Other combinations of reducing the spatial resolutions and multi-level fusions exist.

It is also understood that the sensors are either airborne based sensors or satellite-based sensors or terrestrial sensors. Even though the platforms used for carrying the sensors are different, the principle of image data collection and multi-level sharpening is the same.

LIST OF REFERENCES

[01] N. Keshava and J. F. Mustard, 2002: Spectral Unmixing, *IEEE Signal Processing Magazine,* vol. 19, no. 1, pp. 44-57.

[02] J. M. Bioucas-Dias, A. Plaza, N. Dobigeon, M. Parente, Q. Du, P. Gader, and J. Chanussot 2012: Hyperspectral Unmixing Overview: Geometrical, Statistical, and Sparse Regression-Based Approaches, *IEEE Journal of Selected Topics in Applied Earth Observation and Remote Sensing,* Vol. 5, No. 2, April 2012.

[03] K. G. Nikolakopoulos, 2009: Spatial resolution enhancement of Hyperion hyperspectral data, *WHISPERS'09—First Workshop on Hyperspectral Image and Signal Processing,* 26-28 August.

[04] G. A. Licciardi, M. M. Khan, J. Chanussot, A. Montanvert, L. Condat, C. Jutten, 2011: Fusion of Hyperspectral and panchromatic images using multiresolution analysis and nonlinear PCA band reduction, *IEEE IGARRS* 2011, Vancouver, Canada, 24-29 July.

[05] C. Chisense, J. Engels, M. Hahn and E. Gulch, 2012: Pansharpening of Hyperspectral Images in Urban Areas, *XXII ISPRS Congress,* 25 Aug.-1 Sep. 2012, Melbourne, Australia.

[06] Naoto Yokoya, Norimasa Mayumi, and Akira Iwasaki, 2012: Cross-Calibration for Data Fusion of EO-1/Hyperion and Terra/ASTER, *IEEE Journal of Selected Topics in Applied Earth Observations and Remote Sensing,* in press

I claim:

1. A method for producing a sharpened image comprising the steps of:
  (1) obtaining image data defining a first image, the first image having a first spatial resolution and a first spectral resolution,
  (2) obtaining image data defining a second image, the second image having a second spatial resolution and a second spectral resolution, the second spatial resolution being lower than the first spatial resolution and the second spectral resolution being higher than the first spectral resolution,
  (3) obtaining image data defining a third image, the third image having a third spatial resolution and a third spectral resolution, the third spatial resolution being lower than the second spatial resolution and the third spectral resolution being higher than the second spectral resolution,
  (4) fusing the image data of the second image and the third image to produce a fourth image, and
  (5) fusing the image data of the first image and the fourth image to produce a fifth image, wherein the fifth image is a final sharpened image.

2. The method of claim 1, where
  the image data for the first image having been collected by one or more panchromatic sensors,
  the image data for the second image having been collected by one or more multi-spectral sensors, and
  the image data for the third image having been collected by one or more sensors selected from the group consisting of superspectral and hyperspectral sensors.

3. The method of claim 2, where
  all the sensors are either airborne based sensors or satellite-based sensors or terrestrial sensors.

4. The method of claim 1, where
  the first, second, and third images have a common overlapping area.

5. The method of claim 4, where
  the image data fused in steps (4) and (5) comprises image data defining all or a part of the common overlapping area.

6. The method of claim 1, wherein:
  (1) the first spatial resolution is a high spatial resolution, the first spectral resolution is a low spectral resolution, the first image being called a HR-Pan image;
  (2) the second spatial resolution is a medium spatial resolution, the second spectral resolution is a medium spectral resolution, the second image being called a MR-MS image;
  (3) the third spatial resolution is a low spatial resolution, the third spectral resolution is a high spectral resolution, the third image being called a LR-HS image;
  (4) the fourth image is a sharpened MR-HS image; and
  (5) the fifth image is a sharpened HR-HS image.

7. The method of claim 6, wherein
  the HR-Pan image has a spatial resolution of 1 m and 1 spectral band;
  the MR-MS image has a spatial resolution of 3 m and 10 spectral bands; and
  the LR-HS image has a spatial resolution of 9 m and 200 spectral bands.

8. The method of claim 6, wherein
  step (4) comprising fusing bands of the MR-MS image and bands of the LR-HS image to produce MR-HS bands, wherein the LR-HS bands being fused are located in the same or similar spectral range as the bands of the MR-MS image being fused, to produce fused MR-HS bands, and
  step (5) comprising fusing the band of the HR-Pan image and the fused MR-HS bands, wherein the fused MR-HS bands are located in the same or similar spectral range as the band of the HR-Pan image.

9. The method of claim 6, wherein
  step (4) comprising fusing bands of the MR-MS image and bands of the LR-HS image to produce MR-HS bands, wherein the LR-HS bands being fused are not in the same or similar spectral range as the bands of the MR-MS image being fused, to produce fused MR-HS bands, and
  step (5) comprising fusing the band of the HR-Pan image and the fused MR-HS bands, wherein the fused MR-HS bands are not located in the same or similar spectral range as the band of the HR-Pan image.

10. A method for producing a sharpened image comprising the steps of:
  (1) obtaining image data defining a first image, the first image having a first spatial resolution and a first spectral resolution,
  (2) obtaining image data defining a second image, the second image having a second spatial resolution and a second spectral resolution, the second spatial resolution being lower than the first spatial resolution and the second spectral resolution being higher than the first spectral resolution, (3) obtaining image data defining a third image, the third image having a third spatial resolution and a third spectral resolution, the third spatial resolution being lower than the second spatial resolution and the third spectral resolution being higher than the second spectral resolution, (4) obtaining image data defining a fourth image, the fourth image having a fourth spatial resolution and a fourth spectral resolution, the fourth spatial resolution being lower than the third spatial resolution and the fourth spectral resolution being higher than the third spectral resolution, (5) fusing the image data of the third image and the fourth image to produce a fifth image, (6) fusing the image data of the second image and the fifth image to produce a sixth image, and (7) fusing the image data of the first image and the sixth image to produce a seventh image, wherein the seventh image is a final sharpened image.

11. The method of claim 10, where
the image data for the first image having been collected by one or more panchromatic sensors,
the image data for the second image having been collected by one or more multi-spectral sensors,
the image data for the third image having been collected by one or more superspectral sensors, and
the image data for the fourth image having been collected by one or more hyperspectral sensors.

12. The method of claim 11, where
all the sensors are either airborne based sensors or satellite-based sensors or terrestrial sensors.

13. The method of claim 10, where
the first, second, third, and fourth images have a common overlapping area.

14. The method of claim 13, where
the image data fused in steps (5)-(7) comprises image data defining all or a part of the common overlapping area.

15. A method for producing a sharpened image comprising:

(1) obtaining image data defining a high spatial resolution, low spectral resolution image, such image being called a HR-Pan (VNIR) image;

(2) obtaining image data defining a medium spatial resolution, medium spectral resolution, such image being called a MR-MS (VNIR) image;

(3) obtaining image data defining a low spatial resolution, medium spectral resolution image in another spectral range, such image being called a LR-MS (SWIR) image;

(4) obtaining medium spatial resolution Pan (VINR) image, such image being called MR-Pan (VNIR) image, from the HR-Pan (VNIR) image;

(5) obtaining low spatial resolution MS (VNIR) image, such image being called a LR-MS (VNIR) image, from the MR-MS (VNIR) image;

(6) fusing the LR-MS (SWIR) image and the MR-Pan (VNIR) image to produce a sharpened MR-MS (SWIR) image; and (7) fusing the MR-MS (VNIR) image and the sharpened MR-MS (SWIR) image with the HR-Pan (VNIR) image to produce a sharpened HR-MS (VNIR) image and a HR-MS (SWIR) image.

16. The method of claim 15, wherein
using at least one spectral band of the LR-MS (VNIR) image as reference in the step (6) to fuse the LR-MS (SWIR) image and the MR-Pan (VNIR) image, to produce a sharpened MR-MS (SWIR) image.

17. The method of claim 15, wherein
using at least one spectral band of the MR-MS (VNIR) image as reference in the step (7) to fuse the MR-MS (VNIR) image and the MR-MS (SWIR) image with the HR-Pan (VNIR) image, to produce a sharpened HR-MS (VNIR) image and HR-MS (SWIR) image.

18. An image sensor configuration for airborne or satellite-based or terrestrial imagery, the sensor configuration comprising:
a Pan sensor;
a MS sensor; and
a HS sensor,
wherein the Pan sensor is configured to obtain image data defining a high spatial resolution and low spectral resolution image;
the MS sensor is configured to obtain image data defining a medium spatial resolution and medium spectral resolution image;
the HS sensor is configured to obtain image data defining a low spatial resolution and high spectral resolution image, and
wherein, the sensors cover have the same ground coverage.

19. The image sensor configuration of claim 18, further comprising:
a SS sensor configured to obtain image data defining a spatial resolution between those of the MS sensor and the HS sensor, and a spectral resolution between those of the MS sensor and the HS sensor.

20. An image sensor configuration for airborne or satellite-based or terrestrial imagery, the sensor configuration comprising:
first, second and third image sensors, wherein
the first image sensor having a first spatial resolution and a first spectral resolution,
the second image sensor having a second spatial resolution and a second spectral resolution, the second spatial resolution being lower than the first spatial resolution and the second spectral resolution being higher than the first spectral resolution, and
the third image sensor having a third spatial resolution and a third spectral resolution, the third spatial resolution being lower than the second spatial resolution and the third spectral resolution being higher than the second spectral resolution.

21. A method for producing a sharpened image comprising:
obtaining image data defining a high spatial resolution MS image,
obtaining image data defining a low spatial resolution MS,
simulating a high spatial resolution Pan image from the high spatial resolution MS image by combining all the MS bands of the high spatial resolution MS image into one band, and
fusing the simulated high spatial resolution Pan image with the low spatial resolution MS image to generate a high spatial resolution MS image that has the same bandwidth as the low spatial resolution MS image.

22. The method of claim 21, wherein the spectral ranges of the high spatial resolution MS image is the same as or similar to that of the low spatial resolution MS image.

23. The method of claim 21 further comprising:
reducing the spatial resolution of the high spatial resolution MS image to that of the low spatial resolution MS image through pixel binning to simulate a low spatial resolution MS image, and
in fusing the simulated high spatial resolution Pan image with the low spatial resolution MS image, using at least one spectral band of the simulated low spatial resolution MS image as a reference to generate the high spatial resolution MS image that has the same bandwidth as the low spatial resolution MS image.

24. The method of claim 23 wherein the spectral range of the high spatial resolution MS image is not the same as or similar to that of the low spatial resolution MS image.

25. A method for producing a sharpened image comprising:
obtaining image data defining a high spatial resolution Pan image (HR-Pan image);
obtaining a low spatial resolution MS image having a narrower cumulative spectral bandwidth (LR-MS-N image) than that of the HR-Pan image;
simulating a low spatial resolution MS band (S-LR-MS band) from the HR-Pan image and the LR-MS-N image to fill the spectral gap between the HR-Pan image and the LR-MS-N image; and,
fusing the HR-Pan image with the LR-MS-N image and S-LR-MS band to obtain a high spatial resolution MS image.

* * * * *